(12) United States Patent
Gorbatyuk

(10) Patent No.: US 11,902,683 B1
(45) Date of Patent: Feb. 13, 2024

(54) METHOD FOR FORMING A DIGITAL IMAGE

(71) Applicant: Alexander Ivanovich Gorbatyuk, Tomsk (RU)

(72) Inventor: Alexander Ivanovich Gorbatyuk, Tomsk (RU)

( * ) Notice: Subject to any disclaimer, the term of this patent is extended or adjusted under 35 U.S.C. 154(b) by 0 days.

(21) Appl. No.: 18/032,375

(22) PCT Filed: Nov. 3, 2021

(86) PCT No.: PCT/RU2021/000481
§ 371 (c)(1),
(2) Date: Apr. 18, 2023

(87) PCT Pub. No.: WO2022/231465
PCT Pub. Date: Nov. 3, 2022

(30) Foreign Application Priority Data

Apr. 28, 2021 (RU) .......................... RU2021112571

(51) Int. Cl.
*H04N 25/75* (2023.01)
*H04N 25/74* (2023.01)
*G02B 27/14* (2006.01)

(52) U.S. Cl.
CPC ............ *H04N 25/75* (2023.01); *H04N 25/74* (2023.01); *G02B 27/144* (2013.01)

(58) Field of Classification Search
None
See application file for complete search history.

(56) References Cited

U.S. PATENT DOCUMENTS

2010/0283842 A1* 11/2010 Guissin .............. G02B 26/0816
250/578.1

\* cited by examiner

*Primary Examiner* — Mark T Monk
(74) *Attorney, Agent, or Firm* — Nadya Reingand

(57) ABSTRACT

A technical solution is provided, which allows generating a high-quality digital image using multiple CCD arrays. More specifically, a lens generates an image on an area equal to the sum of photosensitive areas of n CCD arrays. The CCD arrays are shifted from one another. The image is projected via four channels onto all the CCD arrays such that each of said arrays generates a video signal from only one of n sectors of the image. The video signals from the CCD arrays, which operate on a conventional scanning standard and in parallel, are digitized, pre-processed and recorded in a memory from which they are read at a rate n times higher than a clock rate. A digital image is produced by electronically combining the video signals from the CCD arrays that convert adjacent sectors of the image, after which the video signal is post-processed.

2 Claims, 5 Drawing Sheets

METHOD FOR FORMING A DIGITAL IMAGE

FIELD OF THE INVENTION

The invention relates to television methods for generating an image. The invention is applicable in television systems for vehicle registration plate recognition and in iris identification systems. It is most relevant to use this invention when creating television systems with 4K and 8K UHD digital formats, as well as professional digital photo cameras for studio or artistic shooting with printing quality.

BACKGROUND OF THE INVENTION

An increase in the resolution of digital video equipment that uses Charge Coupled Device (CCD) arrays is provided at the cost of a decrease in its sensitivity. The digital video equipment refers to digital photo and video cameras. It is known that that a reduction of pixel sizes does not always improve overall image quality [see Eisman, Katherine, Duggan, Sean, Gray Tim. A36 Encyclopedia of Digital Photography, 3rd ed.: Translated from English-M.: I.D. Williams", 2011.—560 pp.: II.— parallel title in English, ISBN 978-5-8459-1724-9, p. 73 (Russian)]. Since small pixels are less sensitive to light, their signal must be amplified more and, consequently, a noise level in the resulting image increases. There are aberration-free optical systems for large format. Therefore, to improve the quality of a digital image, it is necessary to have a CCD array with an area that can accommodate a maximum number of large pixels. However, the creation of CCD arrays having such dimensions and such parameters is associated with enormous costs. It is known that the world's first large-format digital camera LS 911, which has a 12-megapixel SMOS-array 9×11 inches, costs 106 thousand dollars [see Large Sense LS911—the first large-format digital camera. Cameralabs.org. Largesense LS911.].

The prior art discloses a method for generating an image that has a gigapixel resolution [see Ferra.Ru, Gigapixel camera AWARE2 . . . , 21 Jun. 2012.]. The image is generated using 98 photomodules. Each photomodule comprises a 14-megapixel sensor. The resulting black and white image is generated by computer-merging individual frames within 18 seconds.

The above-described method suffers from the following disadvantages: high cost, high power consumption, the inability to pick up moving objects, and the need for cooling.

RU 2158486 [21 Oct. 2000] discloses a method for scanning a color image and a device for its implementation. The method involves dividing the entire scanning field into elementary sections, scanning each section multiple times with a head that comprises a CCD array. Then, the video signal (v/s) resulted from several scans of each section is averaged to increase a signal-to-noise ratio (s/n). The image of the entire scanning field with an increased resolution is generated by electronically merging all elementary sections.

The method disclosed in RU 2158486 suffers from the following disadvantages: the presence of an electromechanical assembly which worsens the operational reliability of the whole system, and the inability to pick up moving objects.

RU 2143789 [27 Dec. 1999] discloses a method for generating high-definition television images in a camera based on conventional CCDs. The method involves receiving a v/s from CCD arrays operating in parallel, performing the simultaneous digitization, pre-processing and writing of the v/s to a memory, reading it at an increased clock rate, and performing the final processing of the v/s.

RU 2143789 [27 Dec. 1999] also discloses a device for generating high-definition television images in a camera based on conventional CCDs. The device is designed as follows: an optical unit generates two images identical in optical parameters, and the images are then projected onto two CCDs such that two superimposed images are obtained. These images are shifted relative to each other: a horizontal shift is equal to half the distance between pixels, while a vertical shift is equal to half a line spacing. Video signals from the CCD arrays operating in a conventional scanning standard are simultaneously digitized, pre-processed and recorded in the memory, each in its own channel. Thus, an information field is created. The cells of the information field are filled with the processed signal and are arranged in a checkerboard pattern. To obtain a high-definition television image, the parallel-sequential reading of information from the memory is performed. Said reading is performed at a quadruple clock rate according to the principle "through the element/through the line". There is a simple summation of the video signals v/s from both CCD arrays. Then, this information is subjected to final processing.

The method and device disclosed in RU 2143789 suffer from the following disadvantages:
the low quality of the television image, which is limited by HDTV parameters;
the low quality of the television image due to the blurring of fine details and contours of the optical image.

SUMMARY OF THE INVENTION

A single technical result achieved when implementing the claimed group of inventions is an increase in the quality of a digital image by increasing its resolution by n times. In this case, the sensitivity of devices does not deteriorate and is determined by selected CCD arrays.

A claimed method for generating a digital image using multiple CCDs consists in that the CCDs operate in a conventional scanning standard and in parallel. An optical image is simultaneously projected onto the CCD arrays. The CCD arrays are shifted relative to each other, and all video signals from the CCD arrays are simultaneously digitized, pre-processed, recorded in a memory, thereby creating an information field that is read at an increased clock rate and post-processed.

According to the invention, the optical image is generated on an area equal to a sum of photosensitive areas of n CCD arrays, which is simultaneously projected via four channels onto all CCD arrays which are shifted relative to each other such that each of the CCD arrays generates a video signal from only one of n sectors of the given image.

The number $n=m^2$, where m is the number of the CCD arrays both vertically and horizontally, starting from two. Moreover, the CCD arrays of one channel generates video signals from those sectors of the image that do not border on each other.

The information field is read at a rate n times higher than the clock rate by sequentially and electronically combining the video signals from lines of the CCD arrays that convert adjacent sectors of the image horizontally but arranged in different channels, and by sequentially and electronically combining the video signals from frames of the CCD arrays that convert adjacent sectors of the image vertically but arranged in different channels.

An apparatus for generating a digital image using multiple CCDs comprises an optical unit which includes a lens and a neutral translucent mirror optically coupled to the lens. The outputs of the optical unit are connected to the corresponding inputs of optical image-to-digital signal converters which comprise serially connected CCD, analog-digital converter (ADC), pre-processing unit, and memory unit. The outputs of the optical image-to-digital signal converters are connected through a switch to the input of a post-processing unit, the output of which is an output of the apparatus. The control inputs of the CCD, ADC, memory unit and switch are connected to the corresponding outputs of a control unit.

According to the invention, the lens generates an optical image on an area equal to a sum of light-sensitive areas of n CCD arrays. Two neutral translucent mirrors are introduced into the optical unit, for which reason it is made with four outputs connected to the corresponding inputs of n optical image-to-digital signal converters, the outputs of the latter are connected with the inputs of the switch.

The size of the photosensitive area is understood not as the entire area of the accumulation section of the CCD array, which determines a total resolution, but as the area that determines an effective resolution. The area that determines the effective resolution is limited by the line spacing of the CCD array vertically and by diffusion regions horizontally. In this case, the effective resolution is always slightly less than the total one, because the elements arranged at the edges of the crystal are more prone to defects. All information accumulated in the CCD arrays is simultaneously displayed at a low clock rate, digitized, pre-processed, and only that part of the information which relates to the light-sensitive areas is stored in the memory.

According to the claimed group of inventions, four identical optical images provide a necessary and sufficient condition for generating a digital image using n identical CCD arrays. The CCD arrays are installed in the plane of the image such that the area defining the effective resolution coincides with the area of the corresponding sector of the image.

By using the lens that generates the optical image of a desired format and the neutral translucent mirrors that project this image via the four channels on n CCD arrays (where each of the CCD arrays generates the video signal from only one of the n sectors of this image), it is possible to improve the quality of the digital image. This happens, among other things, due to the electronic combination of the video signals from the CCD arrays which convert the adjacent sectors of the image both horizontally and vertically.

Thus, by selecting the CCD arrays with a certain pixel size (certain sensitivity), it is possible to increase their number until a desired resolution is obtained. When using this method, there is no need for a CCD array which can accommodate a maximum number of large pixels.

The proposed technical solutions make it possible to improve the quality of a digital image by increasing its resolution by n times. At the same time, the sensitivity does not deteriorate and is determined by the selected CCD arrays.

DETAILED DESCRIPTION OF THE INVENTION

Figure 1:
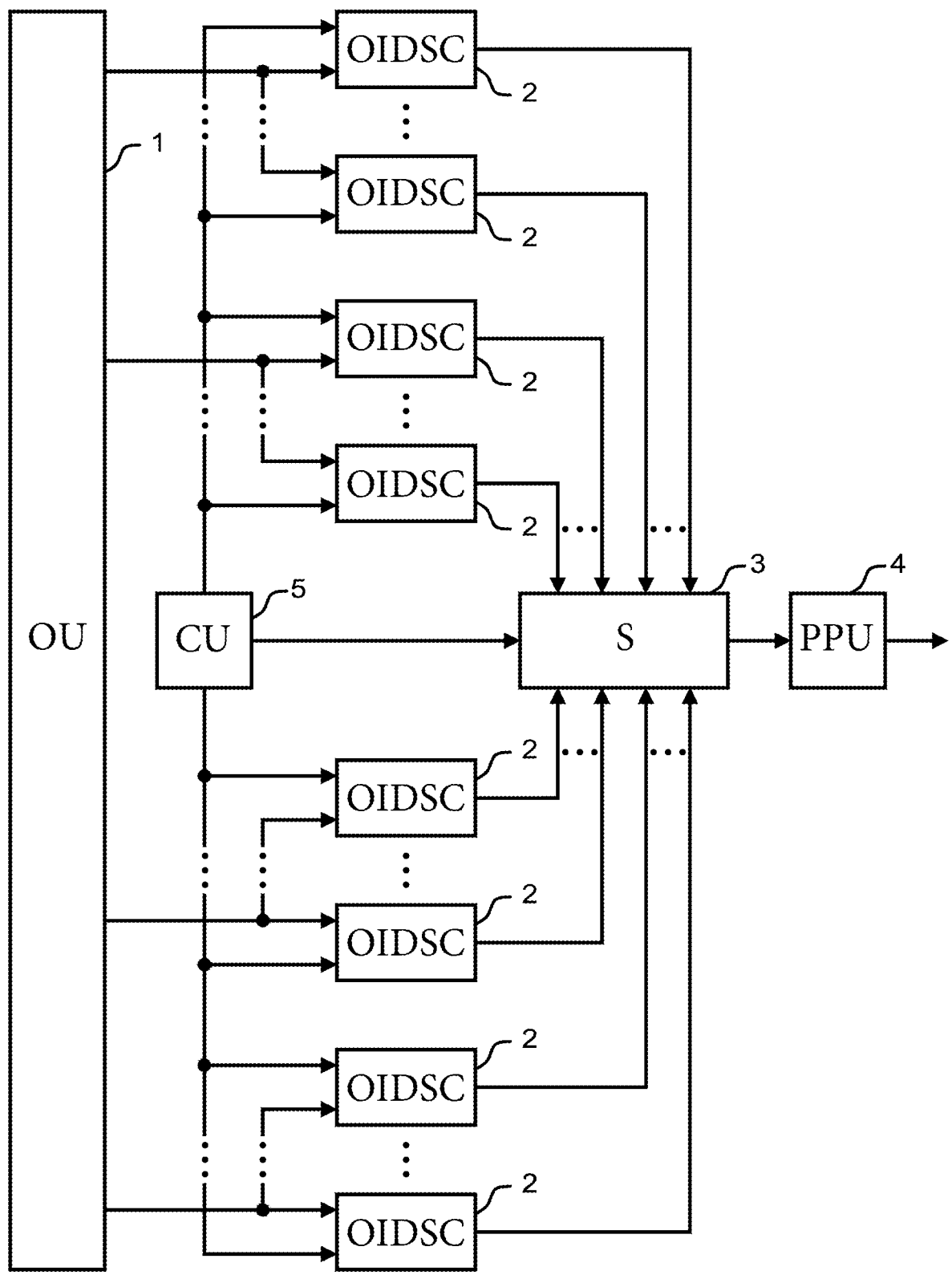
FIG. 1 shows a block diagram of an apparatus for generating a digital image using multiple CCDs.

An apparatus for generating a digital image using multiple CCDs (FIG. 1) comprises an optical unit (OU) 1, the four outputs of which are connected to the inputs of n optical image-to-digital signal converters (OIDSCs) 2, the outputs of which are connected through a switch (S) 3 to the input of a post-processing unit (PPU) 4. The output 4 is the output of the apparatus. Control inputs 2 and 3 are connected to the corresponding outputs of a control unit (CU) 5.

The optical unit 1 generates an image on an area equal to the sum of photosensitive areas of n CCD arrays. This image is fed on four channels to the inputs of the n OIDSCs. All OIDSCs are denoted by the reference sign "2", since they are identical and each of them consists of serially connected CCD, ADC, preprocessing unit and memory unit. All the elements of the block diagram of the apparatus (FIG. 1) are known and industrially applicable. Moreover, digitized video signals, each in its channel, are balanced according to the levels of "black" and "white" with an accuracy of one least significant bit of quantization, subjected to desired special processing and recorded in the memory units. In the post-processing unit 4, post-processing is carried out, including full aperture correction.

Operation of the Apparatus at n=4

Figure 2:
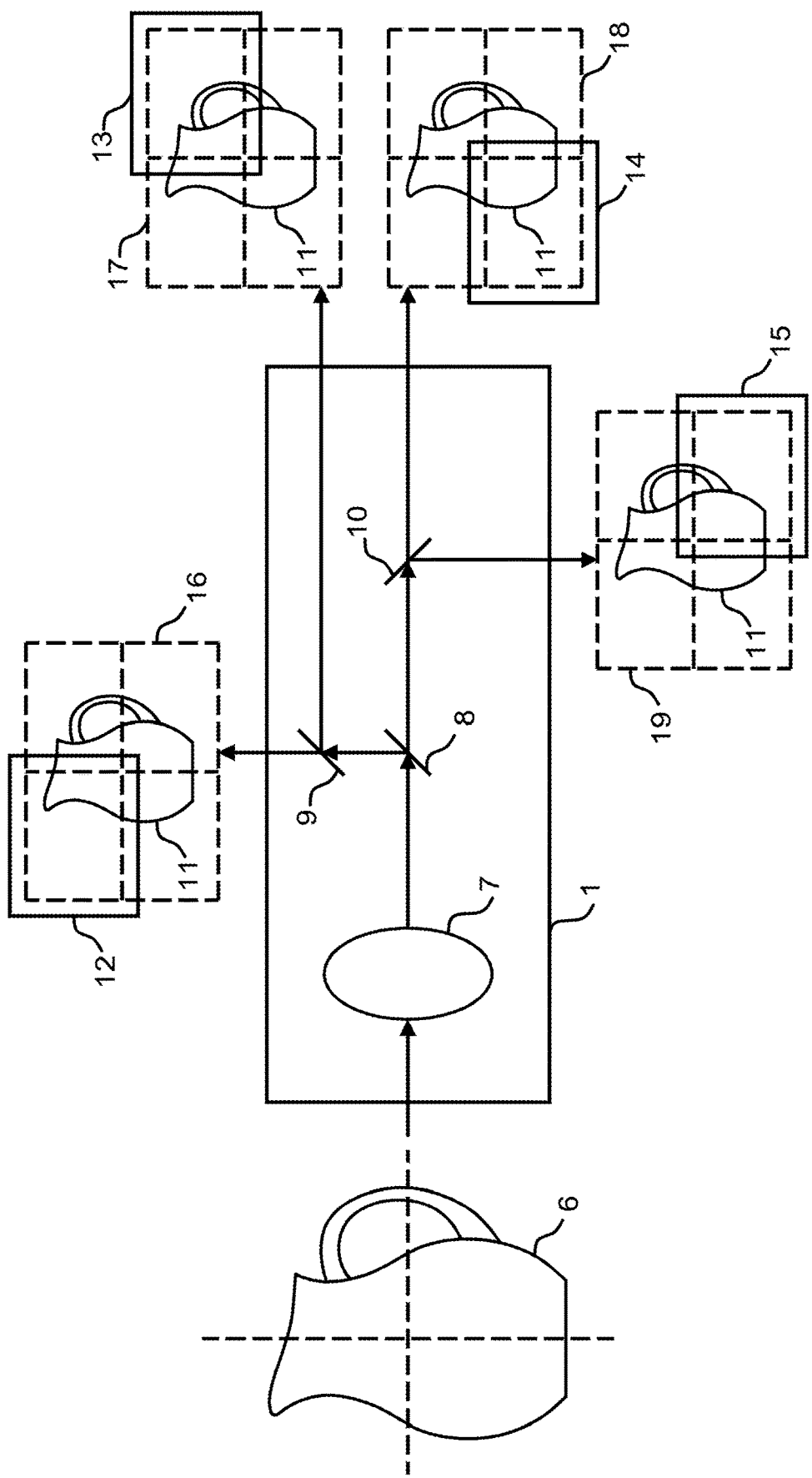
FIG. 2 shows a subject 6 to be imaged, a scheme for generating four identical images 16, 17, 18, 19, and the arrangement of accumulation sections 12, 13, 14, 15 of corresponding CCD 1, CCD 2, CCD 3, and CCD 4 in image data planes.

A jug is selected as a subject 6 to be imaged (FIG. 2). A lens (L) 7 generates an image on an area equal to the sum of light-sensitive areas of four CCD arrays. The image is converted by neutral translucent mirrors (TM) 8, 9 and 10 into four congruent images 16, 17, 18 and 19, which are simultaneously projected through the four channels onto accumulation sections 12, 13, 14 and 15 of corresponding CCD 1, CCD 2, CCD 3 and CCD 4.

The CCD arrays are shifted relative to each other such that each of them generates a v/s from only one of the four sectors of the given image.

The CCD arrays are mounted in the planes of the image such that the boundaries of the sectors, which shown by means of the dashed line in FIG. 2, pass along line spacings of the CCD arrays horizontally and along diffusion regions vertically. The sectors of the image must be the same and match in size with the photosensitive areas of the CCD arrays. The video signals from the CCD arrays operating in standard modes are simultaneously digitized, pre-processed and recorded in the memory of the corresponding OIDSCs 2. This creates an information field. From the outputs of the OIDSCs 2, the information field is read at a quadruple clock rate using the switch (S) 3 and the control unit (CU) and fed to the input of the post-processing unit (PPU) 4. At the output 4, a digital Vis is generated, which corresponds to a high quality digital image. From FIG. 2 it follows that the spatial arrangement of the accumulation sections 12, 13, 14 and 15 of the corresponding CCD 1, CCD 2, CCD 3 and CCD 4 in the planes of the four images 16, 17, 18 and 19 makes it possible to generate the corresponding digital v/s.

Figure 3:
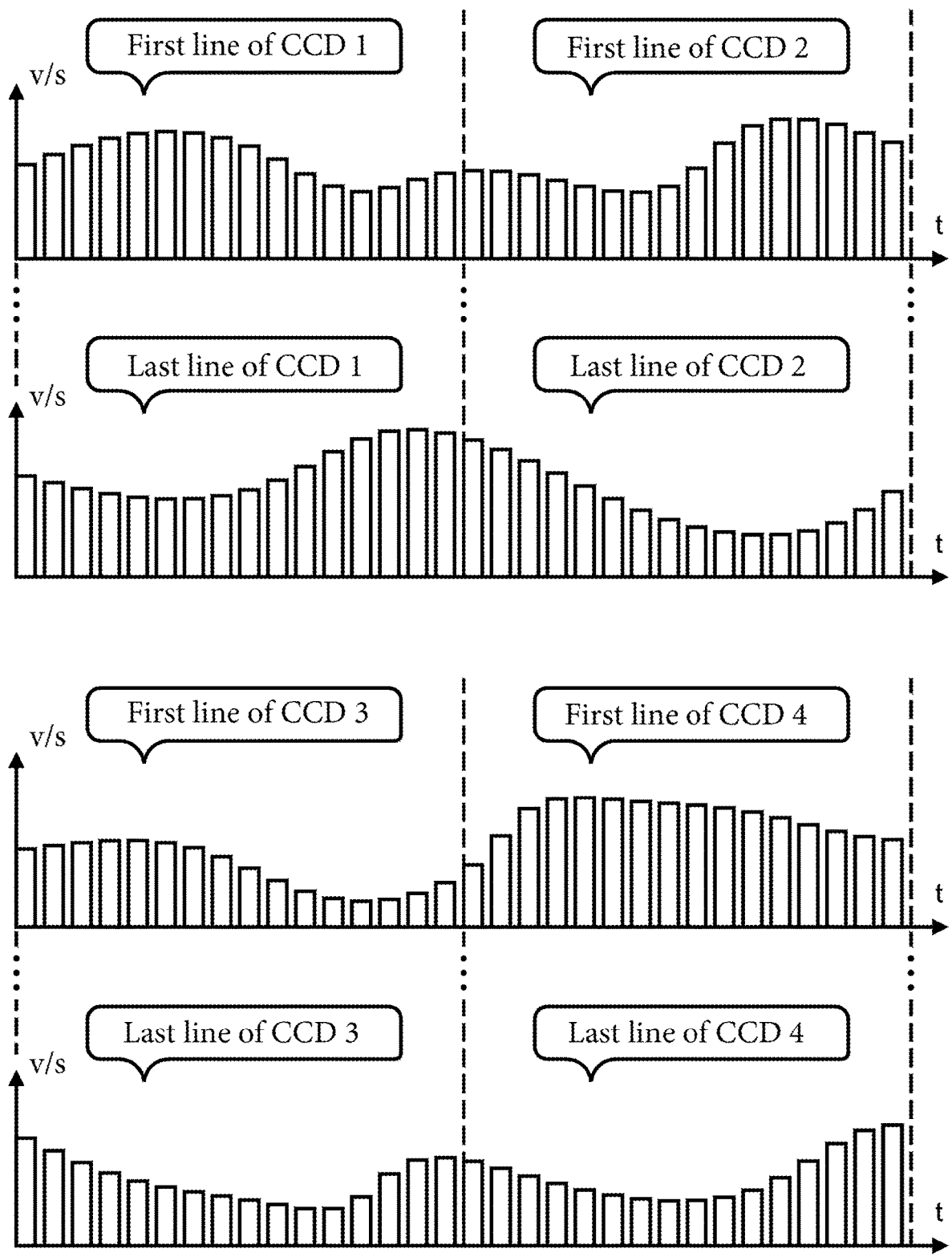
FIG. 3 explains a principle of electronically combining the v/s of corresponding lines of the CCD 1 and the CCD 2 and the v/s of corresponding lines of the CCD 3 and the CCD 4.

A horizontal digital v/s is generated by serially and electronically combining the video signals of the corresponding lines of the CCD 1 with the CCD 2 and the CCD 3 with the CCD 4. A vertical digital v/s is generated by serially and electronically combining the video signals of the corresponding frames of the CCD 1 with the CCD 3 and the CCD 2 with the CCD 4. These CCD arrays convert the adjacent sectors of the image, but are in different channels. The electronic combination of the video signals allows doubling the horizontal resolution and doubling the vertical resolution. For clarity, the lines of the CCD arrays (FIG. 3) comprise 16 light-sensitive elements in analog form.

From the description of the graphic material, it follows that the image is converted to the digital v/s having a quadrupled resolution at the selected sensitivity of the CCD arrays used. In this case, a frame output time does not change. This means that the quality of the digital image has improved.

Operation of the Apparatus at n=9

In this case, the whole process of generating a digital image is essentially the same as discussed above. The difference lies in the fact that the lens (L) 7 generates the image on an area equal to the sum of the light-sensitive areas of nine CCD arrays, and the information field is read from the corresponding OIDSCs 2 at a rate nine times higher than the clock rate.

Figure 4:
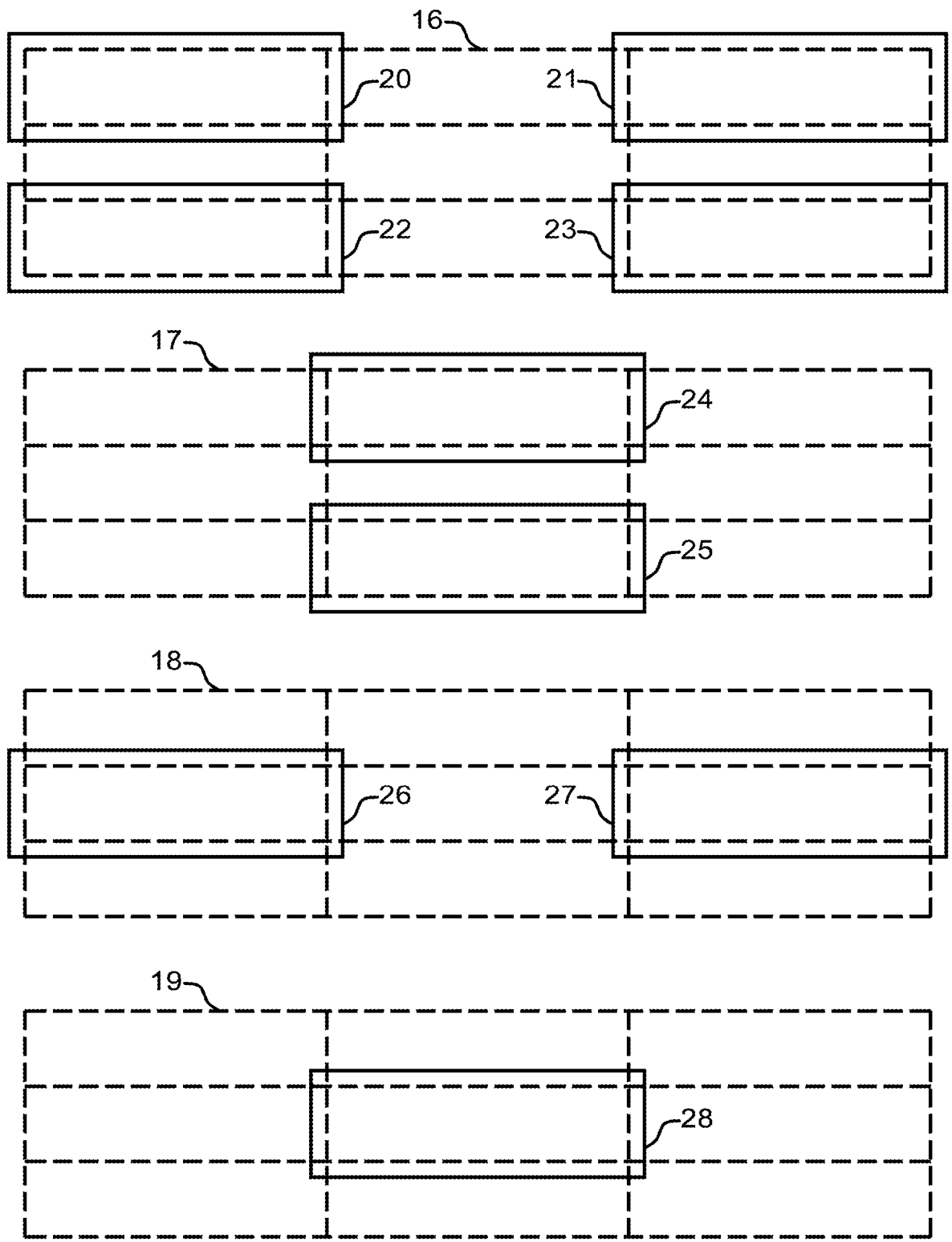
FIG. 4 shows the arrangement of accumulation sections 20, 21, . . . 28 of corresponding CCD 5, CCD 6, . . . CCD 13 in optical image planes 16, 17, 18 and 19.
Figure 5:
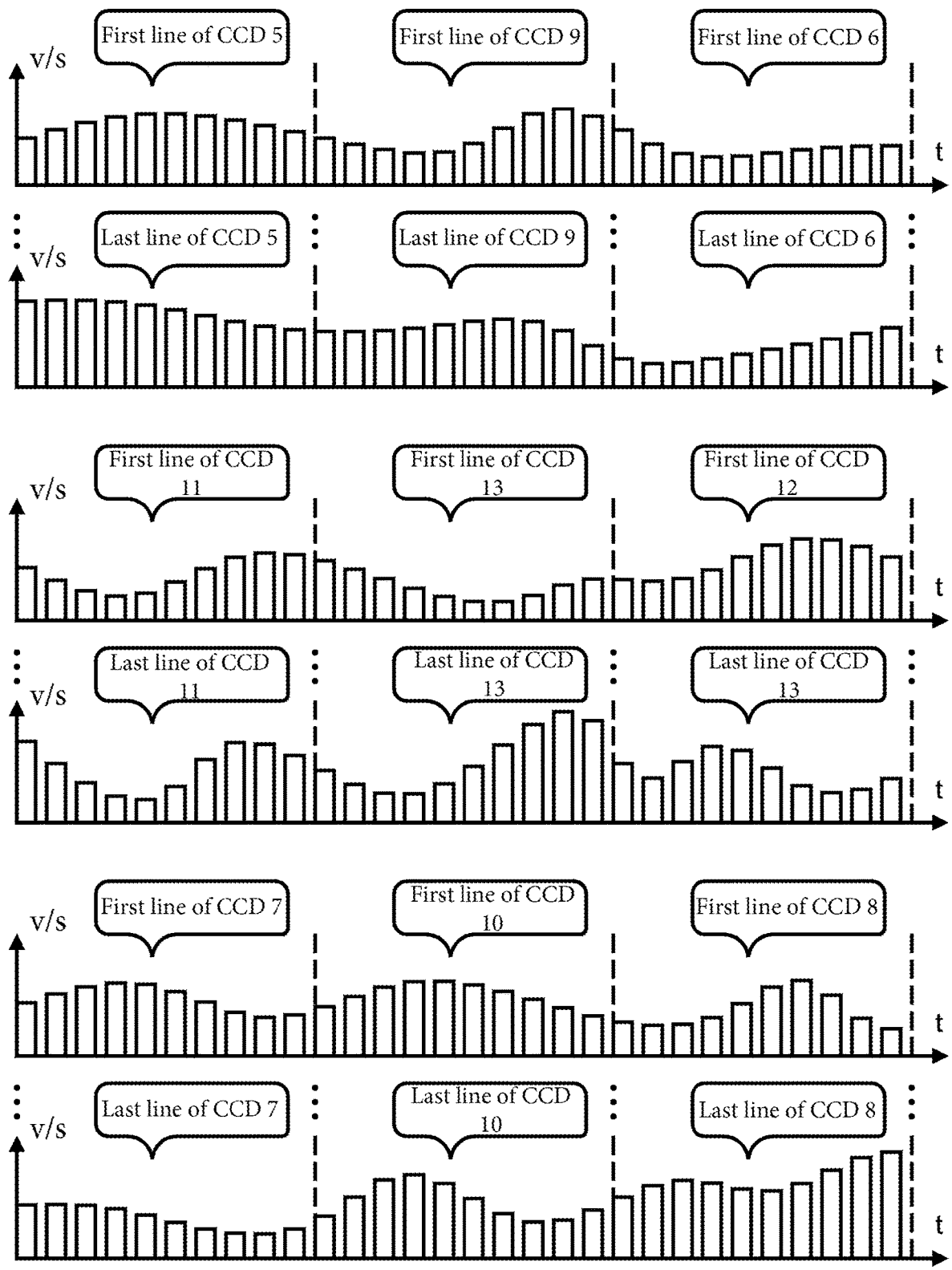
FIG. 5 explains a principle of electronically combining the v/s of corresponding lines of the CCD 5, the CCD 9 and the CCD 6, the v/s of corresponding lines of the CCD 11, the CCD 13 and the CCD 12, as well as the v/s of corresponding lines of the CCD 7, the CCD 10 and the CCD 8.

FIG. 4 shows the arrangement of accumulation sections 20, 21, . . . 28 of corresponding CCD 5, CCD 6, . . . CCD 13 in the planes of four images 16, 17, 18 and 19. The CCD arrays are shifted such that each of them generates a v/s from only one of the nine sectors of the given image. From FIG. 5 it can be seen that the CCD arrays of one channel generate the v/s from those sectors of the image which do not border on each other.

The horizontal digital v/s is generated by sequentially and electronically combining the video signals of the corresponding lines of the CCD 5 with the CCD 9 and the CCD 6, the video signals of the CCD 11 with the CCD 13 and the CCD 12, as well as the video signals of the CCD 7 with the CCD 10 and the CCD 8. The vertical digital v/s is generated by sequentially and electronically combining the video signals of the corresponding frames of the CCD 5 with the CCD 11 and the CCD 7, the video signals of the CCD 9 with the CCD 13 and the CCD 10, as well as the video signals of the CCD 6 with the CCD 12 and the CCD 8. These CCD arrays convert the adjacent sectors of the image, but are in different channels. This increases the resolution per line by a factor of three and per frame by a factor of three. For clarity, the lines of the CCD arrays (FIG. 5) comprise ten light-sensitive elements in analog form.

From the description of the graphic material, it follows that the optical image is converted into the digital v/s having a resolution increased by nine times at the selected sensitivity of the CCD arrays used. In this case, the frame output time does not change. This means that the quality of the digital image has improved.

A single technical result achieved when implementing the claimed group of inventions is an increase in the quality of a digital image by increasing its resolution by n times. At the same time, the sensitivity of the apparatus has not deteriorated and is determined by the selected CCD arrays. The maximum achievable quality of a digital image depends on the ability of an optical system to create an optical image of desired format in a focal plane.

The invention claimed is:

1. A method for generating a digital image using multiple Charge Coupled Device (CCD) arrays,
    wherein the CCD arrays are caused to operate in a conventional scanning standard and in parallel, an optical image is projected simultaneously onto the CCD arrays, the CCD arrays are shifted relative to each other, all video signals from the CCD arrays are simultaneously digitized, pre-processed, recorded in a memory, thereby creating an information field that is read at an increased clock rate and post-processed;
    wherein the optical image is generated on an area equal to a sum of photosensitive areas of n CCD arrays, the optical image is projected simultaneously via four channels onto the CCD arrays which are shifted relative to each other such that each of the CCD arrays generates a video signal from only one of n sectors of the image, $n=m^2$, where m is a number of the CCD arrays both vertically and horizontally, starting from two;
    wherein the CCD arrays of one channel generates video signals from those sectors of the image that do not border on each other, and the information field is read at a rate n times higher than the clock rate by sequentially and electronically combining the video signals from lines of the CCD arrays that convert adjacent sectors of the image horizontally but arranged in different channels, and by sequentially and electronically combining the video signals from frames of the CCD arrays that convert adjacent sectors of the image vertically but arranged in different channels.

2. An apparatus for generating a digital image using multiple Charge Coupled Device (CCD) arrays, comprising an optical unit which includes a lens and a neutral translucent mirror optically coupled to the lens;
    wherein the optical unit has outputs connected to corresponding inputs of optical image-to-digital signal converters which comprise serially connected CCD, analog-digital converter (ADC), pre-processing unit, and memory unit;
    wherein the optical image-to-digital signal converters have outputs connected through a switch to the input of a post-processing unit, the post-processing unit having an output that is an output of the apparatus;
    wherein control inputs of the CCD, ADC, memory unit and switch are connected to corresponding outputs of a control unit;
    wherein the lens is configured to generate an optical image on an area equal to a sum of light-sensitive areas of n CCD arrays,
    wherein two neutral translucent mirrors are included into the optical unit, for which reason the optical unit has four outputs connected to corresponding inputs of n optical image-to-digital signal converters, the outputs of the n optical image-to-digital signal converters being connected with the inputs of the switch.

\* \* \* \* \*